April 18, 1950     W. MANN     2,504,712
SHOE MOUNTING FOR BRAKE ASSEMBLIES
Filed Feb. 22, 1945
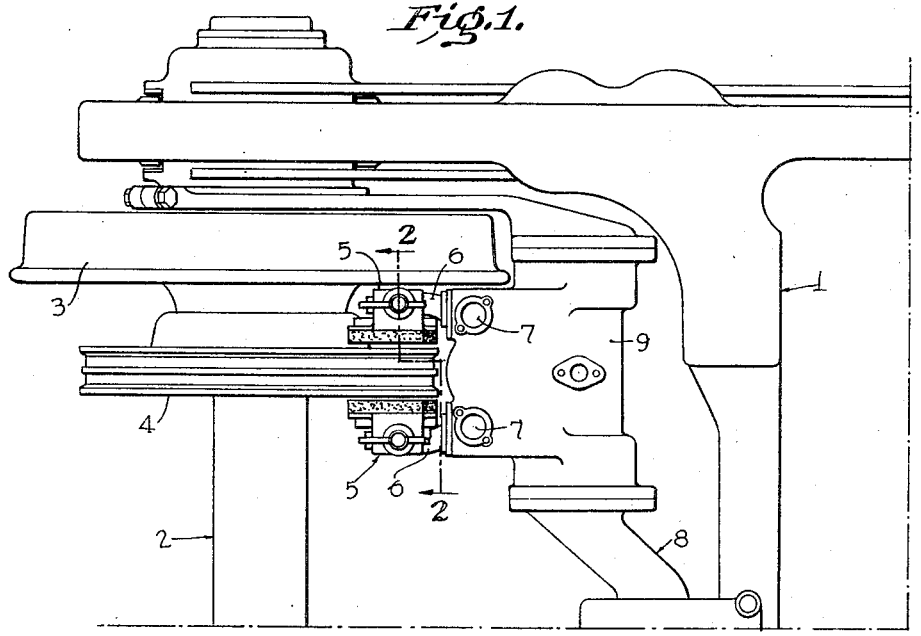
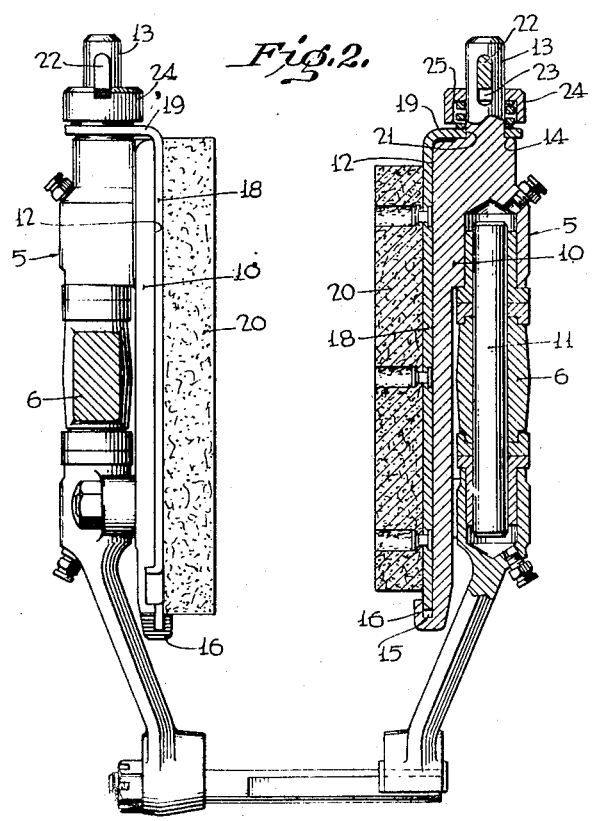
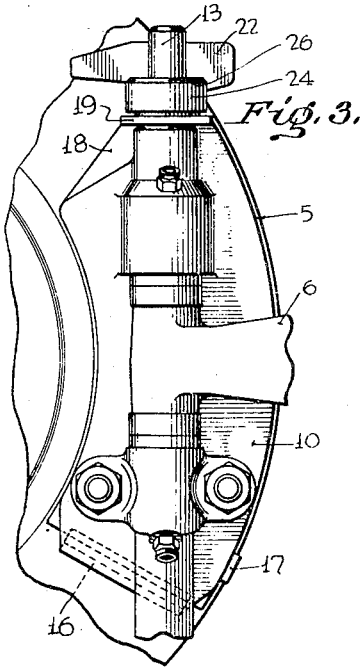
William Mann
INVENTOR
BY John P. Parbop
ATTORNEY Patented Apr. 18, 1950

2,504,712

UNITED STATES PATENT OFFICE 2,504,712

SHOE MOUNTING FOR BRAKE ASSEMBLIES

William Mann, Grosse Pointe, Mich., assignor to The Budd Company, Philadelphia, Pa., a corporation of Pennsylvania Application February 22, 1945, Serial No. 579,223

5 Claims. (Cl. 188—234)

The invention relates to brake mechanism and particularly to such a mechanism in which the wear surfaces or shoes proper are readily mounted or demounted and securely held in place when mounted.

The invention is more particularly concerned with the disc-type of brake in which the shoes engage the opposite sides of a rotary disc-like member to effect the braking.

It is an object of the invention to make the shoe assembly of such brakes of a simplified form, to facilitate the manufacture thereof and in which the shoes proper are readily positioned or removed from the brake head carrying them by simple relative endwise movement.

To this end the brake heads and the shoes proper are constructed as separate sub-assemblies and are provided with interengaging positioning means which securely hold them in their proper relation, and including quick detachable means for readily disconnecting them and thereby permitting the shoes to be moved endwise of the mounting head for disassembly or replacement.

Other and further objects and advantages and the means through which they are attained will become apparent from the following detailed description when read in connection with the drawings forming a part thereof.

In the drawings:

Fig. 1 is a plan view of one-quarter of a railway truck showing a brake mechanism to which the invention has been applied;

Fig. 2 is an enlarged sectional view of the two shoe assemblies cooperating with a rotary disc-like member (not shown in the view), the section being taken substantially along the line 2—2 of Fig. 1;

Fig. 3 is a fragmentary side elevational view of the interengaging brake elements of the invention, shown on an enlarged scale over the showing of Fig. 1.

The invention has been shown applied to the brake mechanism of a railway truck in which the frame 1 is supported in a usual manner from the wheel and axle assembly 2 carrying the wheels as 3, and rotary brake discs as 4, secured to rotate with each wheel.

In cooperative relation with the opposed faces of the disc 4 are arranged the brake shoe assemblies designated generally by 5, 5. These assemblies are pivotally carried by brake levers 6, 6 which in turn are pivotally carried at 7, 7 by a brake support, designated generally by 8 which is in turn carried by the wheel and axle assembly 2 and the truck frame 1 in a manner similar to that disclosed and claimed in copending application, Serial No. 399,779 for Brake mechanism, filed June 26, 1941, now Patent No. 2,413,614, issued December 31, 1946. The levers 6, 6 are actuated by a cylinder actuator 9 similar to the cylinder actuator of the referred to copending application.

Since the invention is not concerned with the general arrangement of the brake mechanism, the above brief description is believed to suffice to indicate the manner in which the invention fits into such arrangement.

Each brake shoe assembly, according to the invention, comprises a brake head, as 10, of arcuate segmental form which has pivotally secured to the outer face thereof as by pivot pin 11, the associated brake lever 6. The opposite or inner face of the brake head 10 is machined flat, this flat face being designated by 12. At its upper end the brake head is formed with a projecting locating and securing pin, as 13, which pin, as shown, may be an integral upward extension of the brake head proper. The upper end of the head beyond which the pin 13 extends is formed with a flat face 14 surrounding the pin and arranged at right angles to the face 12.

In addition to the locating and positioning pin 13, additional shoe positioning means may be provided, such additional positioning means being shown as comprising a groove 15 formed by a projection 16 extending along the lower margin of the head beyond its flat face 12. Additional positioning means may comprise a shoulder 17 formed on the outer margin of the curved outer side of the head, this shoulder also projecting beyond the face 12 and being disposed adjacent the lower margin of the head 10.

The brake shoe proper to be assembled with said head may comprise a sheet metal backing plate having two right-angularly related portions 18 and 19. The portion 18 carries on its inner face, i. e., the face toward the rotary disc 4, a suitable friction material, such as composition brake lining 20, which is secured, as by countersunk rivets, to the backing plate portion 18. The angularly related portion 19 is provided with a hole 21 loosely receiving the locating and securing pin 13.

When the shoe is assembled with the backing plate the upper end is located and secured by the pin 13, while the lower margin of the portion 18, shown extended beyond the composition lining, is located by the groove 15 into which it extends and further by the engagement of its curved outer side with the shoulder 17. This three point positioning and locating means firmly holds the shoe proper in place on the head and also permits it to be readily assembled and disassembled with the head by relative vertical movement. The shoe when so positioned on the head is held in place by quick detachable means, to permit its ready removal and replacement. Such means may comprise a key 22 having its entering end tapered on its upper face and fitting a slot 23 in the pin 13. A cup-shaped washer 24 is preferably located between the key and the portion 19 of the shoe, and a coil spring 25 has its ends engage the bottom of the cup washer and the portion 19, respectively. The key is provided with a cut-out portion 26 in its lower face into which the spring, placed under compression by the insertion of the key, snaps the top of the cup washer 24 when the key is in its locking position, as shown in Fig. 3, to hold it in said position.

When the shoe is secured in position on the back, the portion 18 has its outer face in contact with the flat face 12 of the head, and the frictional engagement between these contacting metal parts under the braking pressure assists the locating and positioning means already described, in maintaining the shoe in correct relation to the head.

With this arrangement, the shoes can be readily disassembled by knocking out the key 22, removing the cup washer 24 and spring 25, and then lifting the shoe upwardly of the locating and securing pin 13. The parts can be readily assembled by proceeding in the reverse order.

In the form shown, means are associated with the lower ends of the brake head 10 for holding the shoes on opposite sides of the disc in parallel relation. Such means are shown entirely similar to the means shown in copending application, Serial No. 529,730, for Brake mechanism, filed April 6, 1944, now Patent No. 2,402,386, issued June 18, 1946, and need not be specifically described herein, because it forms no necessary part of the present invention.

While the invention has been herein described in detail in a preferred form, it will be understood that changes and modifications may be made by those skilled in this art without departing from the main features of the invention, and such changes and modifications are intended to be covered by the appended claims.

What is claimed is:

1. A brake assembly comprising a head having a flat face on one side thereof and locating means adjacent one end of said flat face, a locating and securing pin projecting from the other end of said head lengthwise thereof, a brake shoe comprising a backing plate having a portion thereof seated against said flat face with a margin or margins thereof engaging said locating means adjacent said one end of said flat face and having another portion thereof extending at an angle to said first portion and engaging said locating and securing pin, and quick detachable means cooperating with said pin and said last-named portion for securing the shoe on the head but permitting endwise removal thereof.

2. A brake assembly comprising a head having a flat face on one side thereof and a locating and securing pin projecting from one end thereof, additional locating means associated with said end of the head, a brake shoe comprising a backing plate having a portion for seating against said flat face and a portion extending at an angle therefrom for cooperation with said locating and securing pin and said additional locating means for positioning the shoe on the head, and quick detachable means cooperating with said pin and said last-named portion for securing the shoe on the head but permitting endwise removal thereof.

3. A brake assembly comprising a head having a flat face formed at one end thereof with a positioning groove opening lengthwise of the head and a positioning and securing pin projecting from the opposite end of the head lengthwise thereof, a brake shoe comprising a backing plate having a portion seated against said flat face with its adjacent margin located in said positioning groove and having an angularly extended portion at the opposite end of the head and engaging said pin, and quick detachable means cooperating with said pin for securing said shoe in positioned relation on the head but permitting endwise removal of the shoe from the head.

4. A brake assembly comprising a head having a flat face on one side thereof and a locating and securing pin projecting from one end thereof, a flat locating face on said end adjacent said pin, a brake shoe comprising a backing plate having a portion for seating against said first-named flat face and a portion extending at an angle from said first-named portion for cooperation with said locating and securing pin and said locating face adjacent said pin for positioning the shoe on the head, and quick detachable means cooperating with said pin and said last-named portion for securing the shoe on the head but permitting endwise removal thereof.

5. A brake assembly comprising a head having a flat face formed at one end thereof with a positioning groove opening lengthwise of the head and a positioning shoulder arranged adjacent said end in opposed and cooperating relation to said groove, a positioning and securing pin projecting from the opposite end of said head lengthwise thereof, a brake shoe comprising a backing plate having a portion seated against said flat face with its adjacent margins located in positioning relation with said groove and said shoulder, respectively, said backing plate having an angularly extending portion from said first-named portion at the opposite end of the head, engaging said pin and seated against said opposite end of the head, and quick-detachable means cooperating with said pin and said last-named portion for securing said shoe in positioned relation to the head but permitting endwise removal of the shoe from the head.

WILLIAM MANN.

REFERENCES CITED

The following references are of record in the file of this patent:

UNITED STATES PATENTS

| Number | Name | Date |
|---|---|---|
| 658,856 | Mitchell | Oct. 2, 1900 |
| 931,093 | Simpson | Aug. 17, 1909 |
| 1,561,703 | Down | Nov. 17, 1925 |
| 1,927,012 | Blume | Sept. 19, 1933 |
| 2,027,823 | Hoffman | Jan. 14, 1936 |